June 13, 1967  J. F. BLACK  3,325,387
SULFOXIDATION REACTION
Filed June 29, 1965  2 Sheets-Sheet 1

FIG.-1

(1) $RH \xrightarrow{\sim\sim\sim\sim} R\cdot + H\cdot$
(2) $R\cdot + SO_2 \longrightarrow RSO_2\cdot$
(3) $RSO_2\cdot + O_2 \longrightarrow RSO_2O_2\cdot$
(4) $RSO_2O_2\cdot + RH \longrightarrow RSO_2O_2H + R\cdot$
(5) $RSO_2O_2H + H_2O + SO_2 \longrightarrow RSO_3H + H_2SO_4$
(6) $RSO_2O_2H \longrightarrow RSO_2O\cdot + OH\cdot$
(7) $OH\cdot + RH \longrightarrow H_2O + R\cdot$
(8) $RSO_2O\cdot + RH \longrightarrow RSO_3H + R\cdot$
(9) $H_2SO_4 + xH_2O \longrightarrow H_2SO_4\cdot(H_2O)_x$

OVER-ALL REACTION

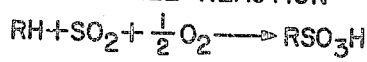

$$RH + SO_2 + \tfrac{1}{2}O_2 \longrightarrow RSO_3H$$

FIG.-2

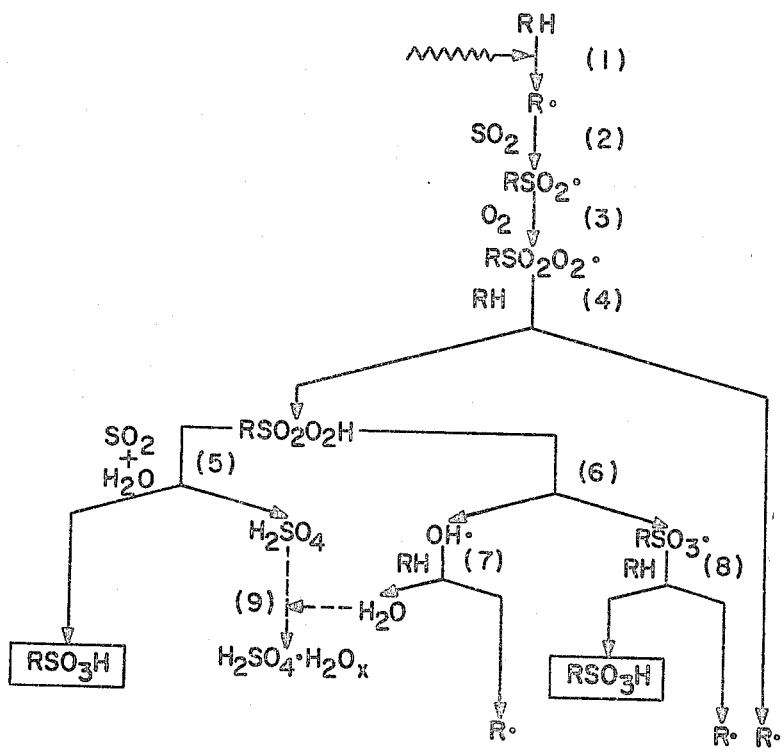

JAMES F. BLACK  Inventor

By L. A. Stimbeck  Patent Attorney

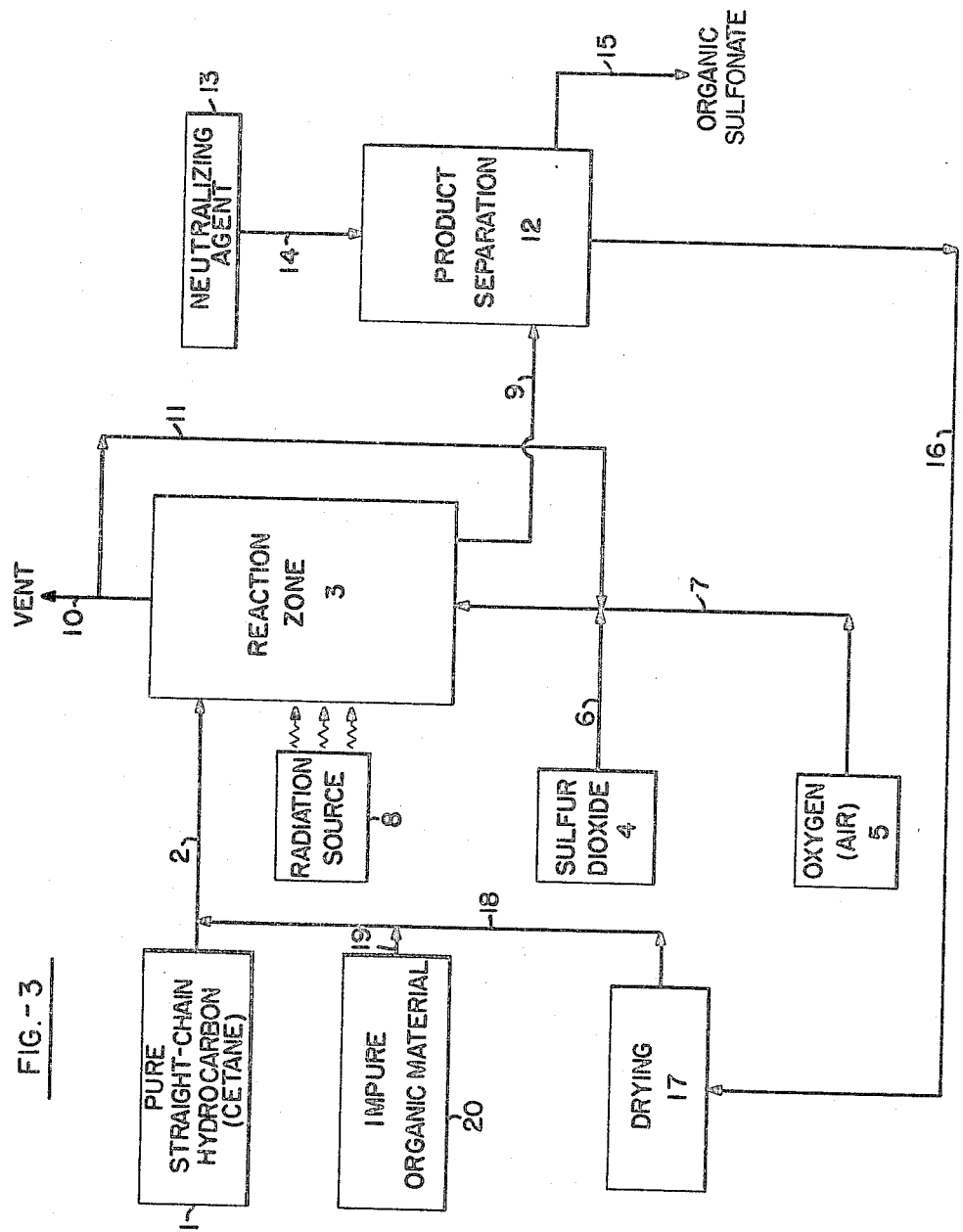

United States Patent Office 3,325,387
Patented June 13, 1967

3,325,387
SULFOXIDATION REACTION
James F. Black, Convent, N.J., assignor to Esso Research and Engineering Company, a corporation of Delaware
Filed June 29, 1965, Ser. No. 481,998
14 Claims. (Cl. 204—162)

This application is a continuation-in-part of Ser. No. 118,221, filed May 15, 1961, which in turn is a continuation-in-part of Ser. No. 862,686, filed Dec. 29, 1959, which in turn is a continuation-in-part of Ser. No. 735,697, filed May 16, 1958, which in turn is a continuation-in-part of Ser. No. 563,194, filed Feb. 3, 1956, all now abandoned.

This invention relates to the reaction of $C_{10}$–$C_{30}$ relatively pure straight chain paraffins with $SO_2$ and $O_2$ in the presence of less than 1 wt. percent, preferably less than 0.1 wt. percent, water based on the paraffins supplied to produce sulfonic acids, the reaction being carried out either (1) by continuously supplying ionizing electromagnetic radiation of $10^{-3}$ to $10^2$ A. wavelength (2) by reacting as in (1) until the reaction mixture becomes self-sustaining and then continuing the reaction by supplying additional paraffin feed, $SO_2$ and $O_2$ in the absence of radiation or (3) by reacting as in (1) until the reaction mixture becomes self-sustaining, discontinuing the radiation and supply of at least one of the gaseous reactants and allowing the reaction mixture to become essentially dormant, thereafter rekindling the reaction by supply of $SO_2$ and $O_2$ and finally, reintroducing liquid feed to continue sulfoxidation.

The present invention provides an extremely economic process for the preparation of volume quantities of $C_{10}$–$C_{30}$ alkane sulfonic acids useful as their alkali metal salts as aqueous household detergents and thickeners for lubricating greases. This invention was developed in the face of teaching such as in Kennedy U.S. 2,702,273 that ultraviolet light is essentially ineffective to cause the reaction of $SO_2$ and $O_2$ with $C_{10}$–$C_{30}$ straight chain paraffins to produce sulfonic acids and that the continuous supply of chlorine is required to produce atomic chlorine which acts as the initiator for the reaction. Similarly, an article in Angew Chem. 62, 302–5 (1950) described the German war time major effort to produce these detergents which also reported failure to obtain practicable sulfoxidation of $C_{10}$–$C_{20}$ hydrocarbons not only with ultraviolet but also with chemical initiators. They were able to solve the problem only by adding large amounts of water and continuously irradiating with high intensity ultraviolet or by adding equally large amounts of acetic anhydride to react with the persulfonic acid formed. All of these prior art processes of course, suffered from additional expense and product purity problems as compared to the present process which surprisingly obtains a self-sustaining clean reaction wtih $C_{10}$–$C_{30}$ straight chain paraffins using small amounts of gamma radiation without requiring the prior art expedients of adding water, acetic anhydride or $Cl_2$.

Suitable feeds for the present process comprise or preferably consist of predominantly $C_{10}$–$C_{30}$, preferably $C_{10}$–$C_{20}$, straight chain paraffins containing less than 10 mol percent, preferably less than 5 mol percent, isoparaffins; less than 2 mol percent, preferably less than 0.3 mol percent, aromatics; less than 7 mol percent, preferably less than 2.5 mol percent olefins and less than 20 mol percent, preferably less than 10 mol percent, cycloparaffins. Examples of the preferred straight chain paraffins are n-decane, n-dodecane, n-tetradecane, n-heptadecane, n-eicosane, n-docosane, etc., and smears of these materials and other members of the series, e.g., a $C_{13}$–$C_{16}$ straight chain paraffin smear. These materials are readily available from petroleum by conventional refinery processes.

The gases used in the reaction are preferably substantially anhydrous. They can be admixed with other inert gases, e.g., air can be used as a source of oxygen. It is preferred to maintain in the reaction mixture at any one time 0.01 to 2.0 moles of free oxygen per mole of saturated hydrocarbon feed, and 0.02 to 4.0 moles of sulfur dioxide per mole of saturated hydrocarbon feed. The mole ratio of oxygen to sulfur dioxide in the reaction zone is in the range of 0.05:1 to 10:1, preferably 1:1 to 1:10.

Ionizing radiation having an energy of over 30 electron volts is the preferred method of initiating the reaction. The ionizing radiation to start the reaction can be obtained from X-ray and beta ray machines; from waste materials from nuclear reactors, such as spent fuel elements or portions thereof; from neutron reactors; and from artificially produced isotopes, such as cobalt 60. The reaction mixture can be exposed to the radiation in a straightforward manner, either batchwise or continuously, in a suitable container or conduit. When using a radioisotope, the reactants can be flowed in, or around the isotope in a plurality of streams. A suitable cobalt 60 gamma radiation source has been described by J. F. Black et al. in the "International Journal of Applied Radiation and Isotopes," volume I, page 256 (1957). It is preferred to use electromagnetic radiation having a wavelength in the range of $10^{-3}$ to $10^2$ A.

Neutron radiation will give the same basic reaction as electromagnetic radiation. A process based upon the use of neutron radiation is not, however, too desirable as it produces from the sulfur atom radioactive species of appreciable half-lives. A product containing such isotopes has little utility. Neutron irradiation can, however, be used to initiate the self-sustaining reaction and the radioactive materal initally produced can be discarded.

The use of beta radiation from Van de Graaff generators or similar machines is also not too desirable as it leads to a high local concentration of heat. Further, it has been found that the reaction has a half-order dependency on dose rate, such that excessively high dose rates result in a poor ultilization of the radiant energy. Such sources that give a localized high input can be used, somewhat inefficiently, to start the reaction if proper care is used. Beta radiation from radioactive materials so arranged as to avoid high dose rates may be conveniently employed.

The source of the radiation is preferably such that the dose rate used to start the reaction is in the range of 20 to $2 \times 10^5$, preferably $1 \times 10^2$ to $3 \times 10^3$, rads per minute, lower dose rates being preferred because of the half-order dependency of the reaction on dose rate. The time of irradiation will, of course, depend upon the dose rate obtainable and will normally be in the range of 5 seconds to 1 day. After reaching the threshold dosage necessary to assure continuance of the sulfoxidation reaction in the absence of irradiation, usually 1000 rads or more, the irradiation may be discontinued and the reaction allowed to continue.

Temperatures and pressures for carrying out the reaction are temperatures of 30 to 200° F., preferably 50 to 150° F., more preferably 80 to 130° F., pressures of 15 to 500 p.s.i.a., preferably 30 to 200 p.s.i.a., more preferably 50 to 130 p.s.i.a. Reaction times in a batch process or residence times in a continuous process are 1 minute to 5 hours, preferably 5 minutes to 1 hour, more preferably 10 minutes to 40 minutes. Conversions are 1 to 50 mol percent based on hydrocarbon feed, preferably 2 to 30 mol percent, more preferably 3 to 15 mol percent.

The self-sustaining sulfoxidation process of the present invention comprises forming a liquid phase reaction mixture of an organic material, preferably having a methylene radical such as a straight chain hydrocarbon, sulfur dioxide, oxygen and an organic peroxysulfonic acid ($RSO_2OOH$), under such conditions that hydrocarbon free radicals are generated spontaneously in the reaction mixture at a rate at least equal to the consumption and loss of hydrocarbon free radicals, and recovering from the reaction mixture an organic product mono-substituted with a sulfo group.

The direct sulfonation of hydrocarbons using sulfur dioxide and oxygen has not heretofore been accomplished in a practical manner. Ionizing radiation, however, has now been found to be a very effective initiator for the sulfoxidation reaction. After the initial "inertia" of the reacting system has been overcome, the reaction proceeds quite readily in the absence of further initiation or radiation and surprisingly high conversions are obtained. "Self-sustaining reaction" as used in this specification and the claims means that the reaction will proceed without externally applied stimulation or catalysts used for the purpose of creating chain initiators. While the self-sustaining reaction can be continuously or intermittently irradiated, if desired, it is not necessary to do so because a chain branching reaction results in a continuous production of free radicals in the hydrocarbon reactants if the operating conditions are properly controlled.

The nature of this invention will be made clear by reference to the drawings attached to and forming a part of this specification, and by the following description of the invention.

In the drawings, FIGURE 1 gives the chemical equations involved in the process of the present invention. FIGURE 2 diagrammatically sets forth the course of the self-sustaining sulfoxidation reaction. FIGURE 3 is a flow plan of a process embodying the teachings of this invention.

Studies have established the existence of two concurrent reactions which proceed from the products formed by the gamma irradiation of a hydrocarbon through which are bubbled sulfur dioxide and oxygen. With reference to FIGURES 1 and 2, the ionizing radiation starts a reaction by forming hydrocarbyl free radicals in the hydrocarbon feed stock according to Equation 1. These free radicals then react with the sulfur dioxide and oxygen absorbed by the hydrocarbon to form peroxysulfonic acid (persulfonic acid) according to Equations 2, 3, and 4. In the presence of water formed in the reaction and further amounts of sulfur dioxide, reduction of the persulfonic acid occurs with the production of some sulfonic acid, according to Equation 5. It has now been found, however, that conversion does not cease after irradiation is terminated and that the persulfonic acid also decomposes and undergoes a delayed branched chain reaction, as shown by Equation 6, producing further amounts of sulfonic acid and two free radicals, as illustrated by Equations 7 and 8.

This reaction is similar in many respects to the self-limiting branched-chain reaction involved in water moderated nuclear reactors. The chain branching reaction is not explosive. It is self-limiting because of the production of water by Equation 7 which leads to the decomposition of the persulfonic acid by reaction 5 and also because the reaction, while exothermic, is inversely dependent on temperature since a temperature increase reduces the solubility and therefore the concentration of two of the reactants, $SO_2$ and $O_2$. It is to be noted that some of the water from the reaction of Equation 7 is taken up by the sulfuric acid as is shown by Equation 9, which helps to prevent the reaction of Equation 5 from being the preferred route for the elimination of the persulfonic acid.

It can be seen that after the reaction has been initiated by the reaction of Equation 1, the sulfoxidation reaction can proceed independently of the initiation reaction because of branching reaction 6 and subsequent reactions 7 and 8 which produce hydrocarbon free radicals that will enter into the reaction starting with Equation 2. Thus, once started, the reaction can proceed indefinitely—without initiation by further amounts of radiation or equivalent methods—so long as sulfur dioxide, oxygen and fresh organic feed are supplied to keep the reaction going.

Once well initiated, the self-sustaining reaction can be removed from the effective area of the radiation source and be made to grow by increasing the reacting volume and continuously adding proportionately increased amounts of feed materials that need not be the same as the initial feed. Also, the reaction mixture in which the self-sustaining reaction is proceeding can be divided, or a portion of it can be withdrawn, and used to start other independent self-sustaining reactions as one would use a blazing fagot from one fire to start another. Of course, the reaction can be again irradiated if it becomes necessary or desirable to do so because of improper balancing of reaction conditions. Planned intermittent irradiations of the reaction mixture can be carried out, for example, if one wished to use as a feedstock a material that contained a borderline amount of free radical abstractors.

The reactants need not be continuously added to the reaction zone, and it is possible, therefore, to transfer the reaction mass from one zone to another or to use a "dormant" reaction mass to "kindle" the reaction. The reaction mass, or a portion thereof, can be cooled and transported for considerable distances. For instance, the flow of one or both of the gaseous reactants can be interrupted for as long as 16 hours or more (without chilling), and thereafter the reaction can be successfully "rekindled" by reintroducing all the reactants. Usually the gases are passed through the dormant reaction mixture until the reaction starts up again and then additional organic feed is added. It usually takes about 30 minutes to an hour to get the reaction well underway. Alternatively, the organic feed is added prior to or concurrent with the flow of reactive gases through the dormant reaction mass. However, there are certain advantages to passing the gases through the reaction mixture before adding any organic feed and therefore this technique is preferred.

In the following examples, which illustrate the features of the invention, the sulfoxidation reactions were effected in a glass reactor equipped with a fritted gas inlet tube and a thermocouple well.

*Example 1*

The radiation source employed was a pipe of cobalt 60 having a strength of about 1000 curies and prepared by neutron bombardment of naturally occurring cobalt metal in a nuclear reactor. The radiation from this cobalt 60 source consisted essentially of gamma rays. One hundred cc. of cetane were charged to a 200 cc. glass reaction vessel which contained a tube ending in a fritted fitting for introducing gases below the surface of the liquid. Then 79 cc. per minute (70° F., one atmosphere) of sulfur dioxide and 120 cc. per minute of essentially pure oxygen were bubbled through the cetane at substantially atmospheric pressure. The initial reaction temperature was about 75° F. and the reaction temperature rose to about 81° F. after 130 minutes when the experiment was terminated. The gamma ray dosage rate was about 0.24 megaroentgen per hour. At the end of the run, the reaction mixture was removed from the reaction vessel and blown with nitrogen for eight hours to remove dissolved $SO_2$. The liquid was then analyzed by a bomb combustion test and showed 0.31 percent combined sulfur which corresponds to 2.2 mole percent cetyl sulfonic acid. The data show that in the presence of ionizing radiation $SO_2$ and $O_2$ will react with a paraffin to produce an alkyl sulfonate.

Example 2

The following reactions were carried out at a temperature in the range of 76° to 86° F. at a dose rate of 0.09 megaroentgen per hour and total dose of 0.18 to 0.36 megaroentgen. The source was a cobalt 60 pipe having a rating of about 2500 curies. Two hundred cc. of the hydrocarbon contained in a 300 cc. vessel were used. Sulfur dioxide was bubbled therethrough at a rate of 7.2 liters per hour, and oxygen at a rate of 3.0 liters per hour using a fritted glass disc to produce fine bubbles. The experiments of the remaining examples were also run in this apparatus.

TABLE

| | Percent Conversion MR [1] | G Molecules Product 100 e.v.[2] | Free Radical Chain Length [3] |
|---|---|---|---|
| n-Hexane | 44.9 | 4,880 | 690 |
| n-Heptane | 38.0 | 7,780 | 616 |
| n-Octane | 65.0 | 5,630 | 820 |
| n-Nonane | 37.1 | 2,920 | 438 |
| Cyclohexane | 57.1 | 6,530 | 1,095 |
| n-Cetane | 27.4 | 1,260 | 250 |
| n-Heptane [4] | | 12,500 | 1,602 |

[1] Conversion of hydrocarbons to sulfonic acid per megaroentgen of radiation.
[2] Number of molecules of sulfonic acid produced per 100 e.v. of absorbed radiation.
[3] Obtained by division of G values by the G values for free radicals produced by the radiolysis of pure hydrocarbons, as reported by Weber, Forsyth and Schuler, "Radical Production in the Radiolysis of the Hydrocarbon", Radiation Research.
[4] Same conditions except 50 cc. of hydrocarbon at 69° to 74° F.

The above data show the high free radical chain lengths that are obtained even when the reaction is continuously irradiated and the efficient use of the radiant energy that can be achieved.

Example 3

The following data were obtained at a temperature of 70° F., a dose rate of 0.09 megaroentgen per hour, and a total dose of 0.36 megaroentgen. Two hundred cubic centimeters of the hydrocarbon were used and sulfur dioxide was bubbled therethrough at a rate of 7.2 liters per hour, and oxygen at a rate of 3.0 liters per hour.

| | Percent Conv./MR | G |
|---|---|---|
| 2,3 dimethyl butane | .169 | 22.6 |
| 2,2 dimethyl butane | .137 | 18.2 |
| Benzene | .0116 | 1.70 |
| Hexene-1 | .317 | 43.3 |
| Hexanol-1 | .0512 | 5.87 |

The above data show the effect of steric hindrance and tertiary carbon atoms, and illustrate the undesirability of having the initial feed stock contain substantial quantities of unsaturates, including aromatics and non-hydrocarbons.

Example 4

Further data were obtained on the unreactive compounds presented in Example 3, under the same conditions as in Example 3. It appears that two of these hydrocarbons, 2,3-dimethylbutane and hexene-1, act as inhibitors. The data presented in the following table show that 10% of either of these compounds can reduce the yields from hexane sulfoxidation by a factor of about 100.

| | Percent Conv./MR | G |
|---|---|---|
| n-Hexane | 44.9 | 4,880 |
| n-Hexane plus 10% 2,3-dimethylbutane | 0.44 | 53.1 |
| n-Hexane plus 10% hexene-1 | 0.26 | 31.6 |
| n-Hexane plus 10% 2,2-dimethylbutane | 51.1 | 5,560 |

These data show also that 2,2-dimethylbutane does not act as a sulfoxidation inhibitor. Its lack of reactivity in the pure state is apparently due to steric hindrance. This result is surprising because a study of molecular models suggests that $SO_2$ should easily add to the —$CH_2$— group in this compound. These results also confirm other data which indicate that —$CH_3$ groups will not support the branched chained sulfoxidation process.

It is possible that the inhibiting effect of the tertiary carbon atoms is due to their propensity for forming peroxides. Experimental data on the radiation induced oxidation of 2,3-dimethylbutane under the same conditions under which sulfoxidation was carried out show, however, that low concentrations of peroxides are produced. Alternatively, it may be because of the stability of the tertiary carbon radicals and the ease with which other radicals can abstract the tertiary hydrogens. A chain reaction could easily lead to the formation of a tertiary hydrocarbon free radical by hydrogen extraction. This radical would be too stable to propagate the chain reaction but could terminate other chains, however, by radical-radical combination. The inhibition caused by olefins can be explained in a similar manner through the formation of relatively stable allyl radicals.

Example 5

The following runs illustrate the advantages to be obtained by discontinuing the irradiation and allowing the reaction to proceed. An appreciably greater amount of product is obtained for the same energy absorption. Two hundred cubic centimeters of the hydrocarbon were used and sulfur dioxide was bubbled therethrough at a rate of 7.2 liters per hour, and oxygen at a rate of 0.2 liter per hour. The dose rate was 0.09 megaroentgen per hour and the total dose received was 0.18 megaroentgen. In this type of reaction, one megaroentgen equals 936,000 Rads.

| | Percent Conversion | | |
|---|---|---|---|
| | (a) | (b) | (c) |
| Hours Irradiation | 2 | 2 | 2 |
| Hours Reaction | 2 | 3 | 4 |
| n-Hexane | 0.44 | 2.8 | 9.3 |
| n-Heptane | 7.0 | 10.5 | 15.2 |
| n-Octane | 12.0 | 16.8 | 10.8 |
| n-Nonane | 6.79 | 11.9 | 14.0 |
| Cyclohexane | 10.3 | 11.3 | 10.8 | a Two hours irradiation, gas flow immediately terminated.
b Two hours irradiation, gas flow continued additional hour.
c Two hours irradiation, gas flow continued additional two hours.

Cyclohexane is surprising in that of all the compounds, it shows the smallest change after discontinuance of the irradiation. It can be seen that heptane and nonane reacted after discontinuance of the irradiation, which tends to establish that hydrocarbons containing an odd number of carbon atoms give a more favorable reaction after discontinuance of the irradiation. The odd numbered carbon atom-containing hydrocarbons, however, require a somewhat longer induction period.

The differences in the behavior of these compounds with respect to the post-radiation reaction may be related to $SO_2$ solubility. N-hexane, n-heptane and n-nonane are better solvents for sulfur dioxide than are cyclohexane and n-octane.

*Example 6*

The following data establishes that an increase in reaction temperature serves to decrease yield. This is true both in the presence and in the absence of water. The higher temperature decreases the solubility of sulfur dioxide, which reduces the rate of sulfonate formation. The data in the following table were collected under conditions similar to those of Example 2, except that the dose rate was 0.3 megaroentgen per hour.

|  | Temp., ° F. | Percent Conv./MR | G |
|---|---|---|---|
| Cetane plus $H_2O$ liq | 81–6 | 4.6 | 211 |
|  | 133–7 | 1.3 | 59.2 |
| Cetane | 94–6 | 18.2 | 833 |
|  | 128–32 | 3.2 | 147 |
| Candle Wax [1] plus $H_2O$ vap | 124 | 0.48 | 15.5 |
|  | 263 | 0.27 | 8.7 |

[1] A premium candle wax having average molecular weight of 320, a melting point of 116–118° F., and an empirical formula of $C_{22.7}H_{47.4}$.

*Example 7*

The presence of water in the reaction mixture decreases yields, both at room temperatures and at elevated temperatures. Once a liquid water phase is present, further additions of water have been found to have no effect. The following data were collected at a dose rate of 0.3 megaroentgen per hour.

|  | Wt. Percent $H_2O$ | Percent Conv./MR | G |
|---|---|---|---|
| Cetane at 85° F | 7 | 4.6 | 211 |
|  | 0 | 18.2 | 833 |
| Cetane at 130° F | 7 | 1.3 | 59.2 |
|  | 0 | 3.2 | 147 |

In experiments using substantially anhydrous reactants, the ratio of sulfonate to sulfuric acid produced is close to 3:1. If each water molecule produced during sulfoxidation reaction were to participate in the formation of sulfuric acid and sulfonate by reaction with the peroxysulfonic acid and $SO_2$, this ratio should be about 2:1 (sulfonic acid/sulfuric acid). Since it is 3:1, it means that all of the water is not available for the reduction reaction, e.g., it complexes as a hydrate of $H_2SO_4$, or an appreciable concentration of water must be built up before the rate of reduction of the peroxysulfonic acid can approach that of its decomposition.

*Example 8*

The data in the following table show that more than about 0.037 and, preferably, about 0.075 megarad of electro-magnetic radiation is necessary to form a critical amount of the persulfonic acid in pure normal hexane in order to achieve a self-sustaining reaction. The dose rate was 0.075 megarad/hour. Two hundred ml. of n-hexane was used at the start. The pressure was atmospheric and the temperature was room temperature. The reaction was given the opportunity to continue for two hours following the indicated radiation period and then was terminated voluntarily.

| Dose During Initial Irradiation | Sulfonate Yield at End of Run | |
|---|---|---|
|  | Percent Conversion | Millimoles Sulfonate Formed |
| 0.037 | 0.93 | 13.3 |
| 0.075 | 7.3 | 103 |
| 0.112 | 8.2 | 119 |

These data were obtained in a series of reactions run on three 200 ml. portions of n-hexane. Each reaction was subjected to the amount of irradiation indicated in the column at the left. Sulfur dioxide and oxygen were supplied in excess during the irradiation period and also for a period of two hours after the removal of the radiation source. The amount of sulfonate in millimoles formed during each experiment is shown in the right hand column. It can be seen in the above table that there is a definite breaking point in the amount of sulfonate formed when the radiation dose was raised from 0.037 and 0.075 megarad.

The procedure used to determine the amount of sulfonte formed was as follows:

The products from the sulfoxidation reaction are (1) sulfonic acid, $RSO_3H$, (2) sulfuric acid, and (3) a mixed sulfuric acid ester, $RSO_2OROSO_2OH$. This method of analysis will determine the total amount of sulfonic acid made whether this is present either as free sulfonic acid or as the sulfonic-sulfuric acid ester. The ester probably hydrolyzes as follows:

$$RSO_2OROSO_2OH + 2H_2O \rightarrow RSO_3H + H_2SO_4 + R(OH)_2$$

The products are extracted from the hydrocarbon with water and diluted to one liter. Aliquots of this solution are tested for (1) percent sulfate, (2) total acid number, and (3) saponification number. The equivalents of titratable acid for each product are identified by these symbols.

Equivalents acid in sulfonate $(RSO_3H) = A$
Equivalents acid in sulfuric acid $(H_2SO_4) = 2B$
Equivalents acid in ester $(RSO_2OROSO_2OH) = C$ The total amount of titratable acid $(A+2B+C)$ is calculated from the total acid number. The equivalents of acid in the form of sulfuric acid $(2B)$ is obtained from the percent sulfate result. The difference between the results of these two calculations provides the total equivalents of sulfonate in the form of ester and free sulfonate.

Total equiv. sulfonate $= (A+2B+C) - 2B = A+C$

The saponification number is used to determine the amount of ester formed. Because the ester is hydrolyzed in this test, the equivalents calculated from this test include both the sulfonate and sulfuric acid which are in the ester plus the free sulfuric acid and sulfonate $$(A+2B+3C)$$

The amount of ester is calculated by taking one-half the difference between the saponification number equivalents and the total acid number equivalent as follows:

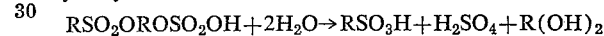
$$\text{Equivalents ester} + \frac{(A+2B+3C)-(A+2B+C)}{2} = C$$

*Example 9*

The self-sustaining reaction proceeds with a steadily increasing rate providing the proper conditions are maintained. This conclusion is indicated by the results from three reactions, each with 200 ml. n-hexane as the hydrocarbon reactant. Each reaction was subjected to two hours of radiation at a dose rate of 0.075 megarad/hr. while sulfur dioxide and oxygen were passed in excess through the liquid hydrocarbon. Run B was continued in the absence of radiation for one hour and run C for two hours. It can be seen from the conversion for run C that during the third hour, 53.8 millimoles of sulfonate were formed and in the fourth hour, 88.9 millimoles were formed. This is an increase of more than 50% in conversion from the first to the second hour of the self-sustaining reaction.

| Reaction Period | First 2 Hrs. | | Third Hour | | Fourth Hour | |
|---|---|---|---|---|---|---|
| Dose Rate (Megarad/Hr.) | 0.075 | | None | | None | |
| Sulfonate Yield During Indicated Period | Percent Conversion | Milli-moles | Percent Conversion | Milli-moles | Percent Conversion | Milli-moles |
| Run A | 8.9 | 126 | | | | |
| Run B | ¹ 8.9 | ¹ 126 | 4.5 | 53.8 | | |
| Run C | ¹ 8.9 | ¹ 126 | ² 4.5 | ² 53.8 | 7.1 | ³ 88.9 |

¹ Assumed from results of Run A.
² Assumed from results of Run B.
³ Reaction voluntarily terminated.
⁴ Room Temperature, SO₂ and O₂ in excess at all times.

*Example 10*

The self-sustaining reaction will continue even after the addition of fresh unirradiated feed. The rate of reaction is slowed down but not stopped as shown by the data in the following table.

| Additional Reactants | Percent Conversion During Period Without Radiation | Millimoles Sulfonate Formed During Period Without Radiation |
|---|---|---|
| None | 10.0 | 129 |
| 50 ml. n-C₆ added at start of period | 7.7 | 110 |

This table shows results from two reactions, each of which had 200 ml. of n-hexane as the initial reactant. In each experiment the n-hexane was subjected to two hours of radiation at room temperature at a dose rate of 0.075 megarad/hr. in the presence of an excess of sulfur dioxide and oxygen. Following this two hour period excess sulfur dioxide and oxygen were passed through the hydrocarbons for two additional hours with radiation absent. In the first experiment no additional reactants were added during the second two hours. In the second experiment 50 ml. of fresh unirradiated n-hexane were added at the beginning of the second two hours. This decreased the yield of sulfonate slightly from that observed in the first experiment but it did not stop the reaction. Both runs were voluntarily terminated.

*Example 11*

Some of the previous examples demonstrated that branched chain paraffins, olefins and aromatics are inhibitors for the reaction in concentrations as low as 1%. It has been established however that the self-sustaining reaction is not stopped by these inhibitors. This is shown by the data in the following table. Two-hundred milliliters of n-hexane was used at the start and SO₂ and O₂ were in excess at all times. The reactions were run for 2 hours with 0.075 megarad/hour of radiation to become self-sustaining, then continued for 2 hours without radiation at room temperature under the conditions indicated in the table.

| Reactants Added During Period Without Radiation | Percent Conversion During Period Without Radiation | Millimoles Sulfonate Formed During Period Without Radiation |
|---|---|---|
| None | 10.0 | 129 |
| 50 ml. 4% benzene in n-C₆ added slowly during period | 2.6 | 37.0 |
| 50 ml. 4% hexene-1 in n-C₆ added slowly during period | 4.4 | 65.5 |
| 50 ml. 4% 2, 3 DMB² in n-C₆ added slowly during period | 3.5 | 51.5 |
| 50 ml. 4% 2, 3 DMB in n-C₆ added at start of period | 3.8 | 58.5 |
| 70 ml. acid treated kerosene³ added slowly | 3.5 | 75.0 |

¹ All runs were terminated voluntarily.
² Dimethyl butane.
³ IBP 392° F., MID. B.P. 443° F., FBP. 506° F. obtained from a coastal crude by heavy sulfuric acid extraction, 66.5% paraffins, 33.5% naphthenes. It contained a small amount of a phenolic antioxidant. Meets ASTM D-396-48T for No. 1 fuel. A self-sustaining reaction could not be obtained in this material when it was irradiated by itself.

Previous experiments had shown that negligible yields were obtained by trying to start the sulfoxidation reaction in acid treated kerosene using gamma radiation as an initiator. The last experiment in the table shows, however, that the kerosene will sulfoxidize if it is added as a reactant to the self-sustaining reaction. The sulfonate yield, calculated on the basis that all the sulfonate is C₆, is higher than that of the other inhibited feed experiments. The actual yield was higher than this since the appearance of the products during work-up indicated that an appreciable amount of the sulfonate had been formed from the kerosene which as is well known is comprised of hydrocarbons containing more than six carbon atoms.

The ability of the self-sustaining reaction to proceed in the presence of compounds which inhibit the initiation of the reaction by radiation in fresh feed is consistent with the branched-chain mechanism. By this mechanism, the reaction becomes self-sustaining when the concentration of persulfonic acid has been built up to the point where it is forming free radicals $RO_2O_2OH \rightarrow RSO_3 \cdot + OH \cdot$ at a rate at least equal to the rate at which radicals are being destroyed by recombination or by surface effects. The compounds which have been identified as inhibitors shorten the chain length of the reaction. In starting with unirradiated feed, the presence of these compounds reduces the rate at which persulfonic acid is formed in the radiation initiated process. In feed stocks containing these inhibitors it would, therefore, require extended irradiation periods to build up the persulfonic acid to the concentration at which the reaction is self-sustaining.

When fresh feed containing aromatics, olefins or branched paraffins is added to a reaction which is proceeding in a self-sustaining manner, they still act to shorten the length of the reaction chains. They do not destroy persulfonic acid, however, since this is the end product of the reaction regardless of the chain length. In the self-sustaining reaction, therefore, the effect of these compounds is not as large as the two principal factors which are keeping the reaction under control, that is, "damping" by the water of reaction and inverse temperature dependence because of the effect of temperature on gas solubility.

*Example 12*

The self-sustaining reaction has been shown to run more rapidly when the product is withdrawn as it is formed. By combining product withdrawal with the slow addition of a fresh feed, the reaction can be run as a continuous process.

uid hydrocarbon feed. At the end of the aforementioned time the temperature of the reaction mixture was about 80 to 90° F. The radiation source was removed and it was observed that the reaction was self-sustaining as evidenced by the fact that product continued to form in the absence of radiation. The product formed during the initial period of 1½ hours was removed by drawing off the bottom layer of the reaction mixture and thereafter the gases were continuously bubbled through the liquid portion of the reaction mixture in the absence of radiation for 1½ hours. At the end of this time, 78 grams of normal cetane was slowly added to the reaction mixture over a period of 3 hours. The product formed during this period was drawn off and found to weigh 67.71 grams. The oxygen and sulfur dioxide gases were then turned off

| Initial Composition of Liquid | First 2 Hours With 0.075 Megarads Radiation | | Last 4 Hours Without Radiation | | |
|---|---|---|---|---|---|
| | Percent Conversion During Period | Millimoles Sulfonate Formed | Additional Reactants | Percent Conversion During Period | Millimoles Sulfonate Formed |
| 200 ml. n-C₆ | ¹ 8.9 | ¹ 125 | 100 ml. of 2% 2,3 DMB in n-C₆ added slowly during period. | 9.6 | 149 |
| 200 ml. n-C₆ | ¹ 8.9 | ¹ 125 | 100 ml. of 2% 2,3 DMB in n-C₆ added slowly during period with continuous product withdrawal. | 11.6 | 165 |

¹ Assumed from results of Run A in Example 9.

This table shows the yields from two reactions with 200 ml. n-hexane as the initial reactant. They were subjected to two hours of radiation (0.075 megarad/hr.) in the presence of excess sulfur dioxide and oxygen. This period was followed by four hours of reaction in the absence of radiation. During this self-sustaining period, 100 ml. of a 2% solution of 2,3 dimethyl butane in n-hexane was added slowly to both reactions. The sulfonate produced was withdrawn at frequent intervals in the second experiment described in the table while product was allowed to accumulate in the first experiment. The larger conversion to sulfonate in the second experiment shows that the continuous process is more efficient. These runs were terminated voluntarily.

*Example 13*

An 80/20 C₈ oxo/tallow fumarate-vinyl acetate copolymer having a viscosity average molecular weight of 150,000 has been sulfoxidized. The reaction of sulfur dioxide and oxygen with this polymer is quite surprising. The polymer was purified by repeated precipitation from a heptane solution into methanol. It was then dissolved in 10 vol. percent concentration in 2,2-dimethyl butene. This solvent was used because as demonstrated previously, it does not sulfoxidize and, more importantly, does not inhibit the reaction.

(1) Reaction:
   150 gm. solution (10% LC–211 in 2,2-DMB).
   SO₂ feed rate 7.2 l./hour.
   O₂ feed rate 3.0 l./hour.
   Time 6.0 hours, does rate 1.6M rad./hr.
   Total dose=9.1M rad.
   Temperature=60° F.

*Example 14*

The following data demonstrate that the sulfoxidation of hydrocarbons can be revived without further irradiation after having been dormant for considerable periods of time.

Normal hexane (132 grams) was irradiated with Co⁶⁰ at a dose rate of 0.075 MR/hour for 1.5 hours while sulfur dioxide (7.2 liters/hour) and oxygen (3 liters/hour) were continuously bubbled through the liq- and the reaction mixture was allowed to lay dormant overnight (ca. 16 hours) at ambient temperature. The next morning the reaction vessel was examined and it was found that no noticeable amount of sulfonic acid product had formed during the night. The gases were again bubbled through the reaction mixture at the above-mentioned rate and after about an hour it was noted that the temperature rose to about 90° F. indicating that the exothermic sulfoxidation reaction had been rekindled. During the first 5 hours following the rekindling of the reaction, 67.18 grams of product were collected. The lower product layer was drawn off and thereafter 66 grams of normal hexane was added to the reaction mixture over a three-hour period. Again, the gases were shut off and the reaction mixture was allowed to remain dormant overnight. Once more no visual amount of product formed during the night and when the lower layer was withdrawn from the reaction mixture, it was found that it consisted of 104 grams of sulfonic acid product. The reaction was initiated by bubbling the gases through the liquid phase at the above-mentioned rates and it was again noticed that the temperature slowly rose and product commenced to form. After the temperature had reached about 80 to 90° F., 132 grams of normal hexane was added slowly over a six-hour period. At the end of the aforementioned time, 84.6 grams of sulfonic acid product was recovered. The flow of the gases was then stopped and the reaction mixture was allowed to stand over the weekend. The oxygen and sulfur dioxide were then passed through the liquid hydrocarbon layer at the specified rates and it was again observed that the temperature increased and product commenced to form in the reaction mixture. When the reaction was well established, 66 grams of normal hexane was slowly added to the mixture over 6 hours and at the end of this time 82.7 grams of sulfonic acid product was collected. Thereafter the reaction was voluntarily terminated.

The cetane sulfonate formed in this example was separated and evaluated according to the procedures described in Example 15. This product had a value of 18.1 in 2 grain water and 17.1 in 15 grain water while the control had values of 9.9 and 6.5, respectively. These tests showed that the cetane had been sulfoxidized and separated by the processes employed since hexane sulfonate would have given resultants equivalent to the control.

In another run carried out under substantially the same conditions, 70 grams of an acid treated kerosene (the same as that used in Example 11) was slowly added to the reaction mixture on the second day in lieu of the 66 grams of normal hexane used in the above run. On the morning of the second day the reacted gases were turned on and bubbled through the liquid reaction mixture at the above-mentioned rates for 5 hours. At the end of this time it was observed that the reaction temperature was 82° F. and 58.4 grams of sulfonic acid product had formed. The lower product layer was drawn off and then the kerosene was slowly added over a period of 1½ hours during which time 17.7 grams of sulfonic acid product was formed.

The above data show that after interrupting the reaction overnight or over a week end, resumption of the flow of reactivation gases is sufficient to rekindle the reaction. This behaviour confirms the existence of a reaction intermediate possessing an appreciable halflife. As mentioned above, this intermediate is believed to be a monoperoxy sulfonic acid. When preserved in a relatively anhydrous medium, the rate of disappearance of this intermediate acid is slow enough to permit revival of the reaction. The data also demonstrates that feeds which are not suitable starting materials for the sulfoxidation reaction, e.g. kerosene, can be added to the self-sustaining sulfoxidation reaction in increments and will not stop the reaction provided the increments are small in relationship to the reacted mass. That is to say, the reaction continues provided the amount of feed having inhibiting properties added at any one time to the self-sustaining reaction mixture in the absence of radiation does not exceed about 10% of the liquid reaction mass.

*Example 15*

This example of the invention shows that feed which contains a compound that would act as an inhibitor if used to start the reaction can be added to a self-sustaining sulfoxidation reaction mixture and will react to form the corresponding sulfonic acid.

Normal hexane (300 milliliters) was irradiated with $Co^{60}$ at a dose rate of 0.075 MR/hour for 2 hours while continuously bubbling sulfur dioxide (7.2 liters/hour) and oxygen (3 liters/hour) through the reaction mixture. At the end of this time the radiation source was removed and it was noted that the reaction was self-sustaining. The reaction vessel was placed in a water bath which was at about 60–80° F. and then 100 milliliters of tetradecene-1 was added dropwise over a 3-hour period in the absence of further irradiation. Following the addition of the high molecular weight alpha-olefin to the reaction mixture, the gases were shut off and the reaction mixture, which weighed about 253 grams, was extracted with 150 milliliters of diethylether and the ether layer, which contained tetradecene sulfonic acid, sulfuric acid, and a trace of hydrocarbon, was separated from the other layer which contained hexane sulfonic acid and the other ether-insoluble components in the reaction mixture. The diethylether extract was then neutralized with 10 weight percent sodium hydroxide and the aqueous layer was separated from the ether layer and dissolved in 14 times its volume of a 50—50 (volume) mixture of isopropanol and water. The ether layer was then extracted 3 times with small portions of the aforementioned isopropanol-water mixture and the extracts were combined with the dilute aqueous layer. The water-alcohol mixture was then heated to about 105–120° F. and saturated with sodium sulfate. Two layers formed and the upper alcohol layer, which contained the tetradecene sulfonate and some sodium sulfate, was separated and diluted with water to reduce the alcohol content from 72 volume percent to 50 volume percent. The dilute alcohol solution was then extracted with petroleum ether to remove the last traces of hydrocarbon and thereafter it was heated to 105–120° F. and saturated with sodium carbonate. The mixture was allowed to cool and separate into two distinct layers. The upper layer which contained the tetradecene sulfonate, 82 volume percent isopropanol and a trace of sodium carbonate was separated and diluted with 20 volume percent of 99 percent isopropanol. The resulting alcohol solution was cooled in an ice bath and seeded with solid sodium carbonate particles and filtered to remove the last traces of sodium carbonate. The filtrate which consisted of tetradecene sulfonate in 85 volume percent isopropanol was evaporated under vacuum and the residue which consisted of sodium tetradecene sulfonate was evaluated for detergency in a cotton launderometer test as a built detergent having the following composition:

| Ingredients: | Parts by weight |
|---|---|
| Sodium tetradecene sulfonate | 25 |
| Ninol AD 31 (lauric isopropanol amide) | 3 |
| Sodium tripolyphosphate | 32 |
| Tetra sodium pyrophosphate | 10 |
| Sodium silicate | 15 |
| Sodium sulfate | 14 |
| Carboxy methyl cellulose, low viscosity | 1 |

In the soil removal test which was carried out at about 130° F. using a .35 weight percent detergent composition it was found that the tetradecene sulfonate had a value of 17.3 in 2 grain water and 15.5 in 15 grain water while the control had ratings of 9.9 and 6.5, respectively. These data show that the tetradecene sulfonate formed in the self-sustained reaction mixture (in the absence of radiation) is a moderately active detergent in aqueous solutions. It is far superior to hexane sulfonate that has been prepared in a similar manner since the latter would give results equivalent to the control.

In a similar manner other sulfonates have been prepared from hexadecene-1, dodecyl benzene and octadecane and these have likewise been found to have good detergency properties in an aqueous medium.

*Example 16*

A continuous process embodying the teachings of this invention is illustrated in FIGURE 3. A hydrocarbon from source 1 is introduced by line 2 into reaction zone 3. The design of the reaction zone is such preferably that the surface to volume ratio is less than 1 ft.$^{-1}$. To start the reaction, sulfur dioxide and oxygen from sources 4 and 5 are passed by lines 6 and 7 to the bottom of zone 3 and bubbled up through the hydrocarbon. Radiation from any convenient zones 8, say a shielded nuclear reactor, is then introduced into the reaction mixture creating free radicals which initiates the chain reaction. After the reaction has been satisfactorily commenced, additional feed from line 2 is passed continuously into reaction zone 3, and product is withdrawn by line 9. Also, the radiation supplied from zones 8, is terminated if desired.

The product withdrawn comprises unreacted hydrocarbon, sulfonic acid and in some instances disulfonic acids depending upon the conditions maintained in the reaction zone. The unconsumed sulfur dioxide and oxygen may be vented from the top of the reaction zone 3 by line 10. Preferably, however, this gas is recycled by line 11. Before being recycled it can be purified or otherwise treated to increase the concentration of sulfur dioxide and oxygen therein. If the gases supplied by lines 6 and 7 contain some inert gas, for example, when air is used as a source of oxygen, then venting of the exit gases will be necessary. Before the nitrogen is vented, however, the sulfur dioxide can be recovered therefrom by conventional processes such as refrigeration.

The product in line 9 is passed to product separation zone 12. As so far described, sulfonic acids are the product obtained. The sulfonic acids produced in accordance with the present invention are recovered from the reaction mixture by conventional techniques. They can be extracted using water and/or alcohols, such as isopropyl alcohol. During or after the extraction step, the sulfonic acids can be converted to sulfonates by reaction with basic compounds. Basic compounds of metals, such as oxides, hydroxides and carbonates can be used. It is usually desirable to form alkali or alkaline earth metal sulfonates for subsequent use as detergents. Specific examples of compounds that can be used to neutralize the sulfonic acids are sodium carbonate, calcium oxide and hydroxide, potassium hydroxide, barium oxide and hydroxide, etc. In neutralizing the sulfonic acid, stoichiometric proportions can be employed, although usually a slight excess of the base, e.g., 5 to 20 percent, will be employed. As shown, a neutralizing agent is admitted to zone 12 from reservoir 13 via line 14.

The organic sulfonate product separated in zone 12 is recovered by line 15. The unreacted hydrocarbon feed material is returned to the reaction zone via line 16. As previously mentioned, it is preferred to control the concentration of water in the reaction zone and this can in part be accomplished by drying the recycle stream in drying zone 17 before passing it on to zone 3 by line 18. Drying the stream can be accomplished by such means as passage over neutral or acidic water adsorbents (e.g. $P_2O_5$, $Ca_2SO_4$).

When the operation of the process has become satisfactorily established, a less expensive feed can be substituted in whole or in part for the hydrocarbon from zone 1. Thus impure organic material, e.g. a virgin gas oil from a naphthenic crude, is supplied to reaction zone 3 from storage zone 20 via lines 19, 18 and 2. By replacing some of the original pure hydrocarbon feed stock with less pure or impure material in this manner, a greater variety of sulfonates can be obtained as products, i.e., in addition to straight chain or alkyl sulfonates, one can obtain naphthenic and aromatic sulfonates. These sulfonates can be separated one from another by manners known to the art.

What is claimed is:

1. A process for sulfoxidizing hydrocarbons comprising reacting a $C_{10}$–$C_{30}$ relatively pure straight chain paraffin in the liquid phase at temperatures of 30 to 200° F. for a time sufficient to produce significant quantities of sulfonic acids with $SO_2$ and $O_2$ in the presence of high intensity ionizing radiation having a wavelength in the range of $10^{-3}$ to $10^2$ A. continuously supplied at least until the reaction becomes self-sustaining, and recovering an alkane sulfonic acid from the reaction mixture.

2. The process of claim 1 in which the high intensity ionizing radiation is electromagnetic radiation and wherein the sulfoxidation reaction occurs in the presence of less than 1 wt. percent water based on the weight of the paraffin.

3. The process of claim 1 in which the relatively pure straight chain paraffin contains less than 10 mol percent isoparaffins, less than 2 mol percent aromatics, less than 7 mol percent olefins and less than 20 mol percent cycloparaffins.

4. The process of claim 1 in which said $SO_2$ and $O_2$ are bubbled through the paraffin, the mol ratio of $SO_2$ to paraffin being in the range of 0.02 to 4.0 and the mol ratio of $SO_2$ to $O_2$ being in the range of 20:1 to 1:10.

5. The process of claim 1 in which the radiation is continuously supplied after the reaction becomes self-sustaining.

6. The process of claim 1 in which the reaction is continued for a time sufficient to produce conversions to sulfonic acids of 2 to 50 mol percent based on paraffin.

7. The process of claim 1 in which the radiation is gamma radiation.

8. The process of claim 1 in which the amount of radiation supplied is 100 to 3000 rads per minute, the temperature is 50 to 150° F. and the pressure is 30 to 200 p.s.i.a.

9. The process of claim 1 in which the reaction is quenched with water prior to recovering the alkane sulfonic acid.

10. The process of claim 1 in which radiation is discontinued after the reaction becomes self-sustaining and the reaction is continued in the absence of radiation.

11. The process of claim 1 in which radiation is discontinued after the reaction becomes self-sustaining and thereafter additional paraffin, $SO_2$ and $O_2$ are added to the reaction mixture and the reaction is continued for a time sufficient to produce significant additional quantities of sulfonic acids before recovering alkane sulfonic acids from the reaction mixture.

12. The process of claim 11 in which the reaction is continuous and the reaction mixture is removed from the effective area of radiation once the reaction is self-sustaining and thereafter additional paraffin, $SO_2$ and $O_2$ are added and the reaction is continued for a time sufficient to produce significant additional quantities of sulfonic acids before recovering alkane sulfonic acids from the reaction mixture.

13. The process of claim 1 in which the reaction mixture is withdrawn from the effective area of radiation after the reaction mixture becomes self-sustaining and thereafter the reaction mixture is allowed to become essentially dormant in the absence of supplying paraffin and at least one of the $SO_2$ and $O_2$ reactants, and thereafter rekindling the reaction mixture by the addition of $SO_2$ and $O_2$ and then introducing additional $C_{10}$–$C_{30}$ straight chain paraffin into the reaction mixture at a rate such that the reaction continues and said additional paraffin is sulfoxidized followed by recovering alkane sulfonic acids from the reaction mixture.

14. The process of claim 13 in which the reaction mixture is allowed to become essentially dormant in the absence of supplying both $SO_2$ and $O_2$.

References Cited

UNITED STATES PATENTS 2,702,273  2/1955  Kennedy _____ 204—162

OTHER REFERENCES

Orthner: Angew. Chem. 62, 302–5 (1950), pages 2–5.
Martin: Chemical Engineering News (April 1955), pages 1423–1428.

JOHN H. MACK, *Primary Examiner.*

H. S. WILLIAMS, *Assistant Examiner.*